United States Patent [19]

Watanabe et al.

[11] Patent Number: 5,098,185

[45] Date of Patent: Mar. 24, 1992

[54] AUTOMATIC TRACKING TYPE MEASURING APPARATUS

[75] Inventors: Kaname Watanabe, Tokyo; Kohji Kittaka, Nara, both of Japan

[73] Assignees: Japan Industrial Land Development Co., Ltd., Tokyo; Technical System Co., Ltd.; Kittaka Engineering Laboratory Co., Ltd., both of Osaka, all of Japan

[21] Appl. No.: 460,109

[22] PCT Filed: Jun. 15, 1989

[86] PCT No.: PCT/JP89/00597

§ 371 Date: Feb. 13, 1990

§ 102(e) Date: Feb. 13, 1990

[87] PCT Pub. No.: WO89/12836

PCT Pub. Date: Dec. 28, 1989

[30] Foreign Application Priority Data

| Jun. 15, 1988 | [JP] | Japan | 63-147520 |
| Aug. 11, 1988 | [JP] | Japan | 63-201736 |
| Aug. 29, 1988 | [JP] | Japan | 63-214601 |
| Aug. 29, 1988 | [JP] | Japan | 63-214602 |
| Mar. 2, 1989 | [JP] | Japan | 1-50676 |

[51] Int. Cl.$^5$ .................. G01C 3/00; G01C 3/08; G01C 5/00; G01B 11/26
[52] U.S. Cl. .................. 356/5; 356/1; 356/141; 356/152
[58] Field of Search .................. 356/1, 5, 141, 152

[56] References Cited

U.S. PATENT DOCUMENTS

| 3,664,748 | 5/1972 | Bezu | 356/152 |
| 3,690,767 | 9/1972 | Missio et al. | 356/141 |
| 3,846,026 | 11/1974 | Waters | 356/152 |
| 4,025,193 | 5/1977 | Pond et al. | 356/152 |
| 4,721,385 | 1/1988 | Jelalian et al. | 356/152 |
| 4,847,511 | 7/1989 | Takada et al. | 356/152 |

FOREIGN PATENT DOCUMENTS

| 577668 | 2/1957 | Japan . |
| 52-99847 | 8/1977 | Japan . |
| 53-143259 | 12/1978 | Japan . |
| 59-8221 | 3/1984 | Japan . |
| 59-79173 | 5/1984 | Japan . |
| 60-205270 | 10/1985 | Japan . |
| 61-45981 | 3/1986 | Japan . |
| 62-15479 | 1/1987 | Japan . |
| 63-73178 | 4/1988 | Japan . |
| 63-120215 | 5/1988 | Japan . |

*Primary Examiner*—Stephen C. Buczinski
*Attorney, Agent, or Firm*—Oblon, Spivak, McClelland, Maier & Neustadt

[57] ABSTRACT

A reflector provided on a land is automatically collimated in such a way that it always comes to the center of the field of view of an automatic tracking type measuring apparatus provided on a platform. When the platform moves vertically or horizontally in this state, the reflector moves within the field of view. Then, a drive signal is supplied to a servo system to cause the reflector to come to the center of the field of view. Based on data measured by the apparatus, the platform is positioned.

9 Claims, 10 Drawing Sheets

AUTOMATIC TRACKING TYPE MEASURING APPARATUS

TECHNICAL FIELD

The present invention relates to an automatic tracking type measuring apparatus for use in measuring the position of a working platform on a sea, for example.

BACKGROUND ART

Conventionally, in determining the position of a working platform on a sea, two light wave distance measuring instruments set apart on the working platform receive light coming from a fixed light generator located on a land. As the distance between the two distance measuring instruments is known, three sides of a triangle connecting the three points, the fixed light generator and two distance measuring instruments can be known, and this triangle can be specified. Therefore, the position of the working platform can be specified with the fixed light generator as a reference.

A working platform on a sea usually moves and floats vertically as well as horizontally during work due to waves, current, winds, etc. It is very difficult under such conditions to measure the position of the working platform at a high accuracy efficiently in a short period of time. Particularly, it is significantly difficult to always keep the light generator on a land within the field of view of the distance measuring instruments due to rocking of the working platform caused by waves. As such a measuring apparatus, there is proposed a light wave distance measuring apparatus of an automatic tracking type.

As such an automatic tracking type light wave measuring apparatus, as disclosed in, for example, Published Examined Japanese Utility Model Application No. 59-8221, there is known an apparatus constituted as a combination of a collimating light wave distance measuring instrument, which is placed on a movable body such as a platform and has a collimating telescope, mounted at the top or bottom center of a light wave distance measuring instrument body supported rotatable horizontally and rockable vertically in such a way that its optical axis is in parallel to the optical axis of the distance measuring instrument, and has quartersplitted light receiving elements secured at the proximity of the focus of an objective lens of the telescope in such a way that light from a light generator located on a land enters the center of the quarter-splitted light receiving elements, and a received light image originating from collimation deviation intersect perpendicularly in the horizontal and vertical direction of the quarter-splitted light receiving elements to amplify and supply the differential outputs of two pairs of light receiving elements horizontally and vertically facing each other to horizontal and vertical driving motors of a support mechanism of the distance measuring instrument, thus ensuring automatic tracking in the direction of a receiving light source, and a reference light source device, which is fixed, in accordance with the distance between the light wave distance measuring instrument body and the collimating telescope, at an upper portion or lower portion of, and in parallel to the optical axis of, a corner prism provided as a light generator on a land, which prism has a single or composite objective lens or cylindrical lens attached to the front face of a light generator for increasing efficient use of a flux of light and irradiating light in a wide horizontal range and has a flux of signal light from the light generator changed as flicker light by a chopper provided at the front thereof to be distinguished from natural light.

Since the above conventional automatic tracking type light wave measuring apparatus has a collimating light wave distance measuring instrument placed on a platform and a reference light generator on a land which is provided with a chopper for ensuring discrimination between a flux of signal light from a light generator and natural light, it is necessary to provide a battery as a power source for the reference light generator, thus requiring periodic maintenance of the battery, light generator and chopper. Further, since a single or composite objective lens or cylindrical lens is attached to the front face of the light generator for irradiation in a wide horizontal range, the intensity of a flux of light is reduced, making it impossible to ensure automatic tracking for a long distance.

Further, a received light image originating from collimation deviation intersects perpendicularly in the horizontal and vertical direction of the quarter-splitted light receiving elements to amplify the differential outputs of two pairs of light receiving elements horizontally and vertically facing each other. Accordingly, continuous tracking is possible within a narrow range where light coming from the light generator does not deviate from the center of the quarter-splitted light receiving elements, but automatic tracking cannot be provided if the light deviates from the center. Depending on the degree of natural interference, therefore, collimation should frequently be done by an operator.

It is an object of the present invention to provide an automatic tracking type measuring apparatus which overcomes the problems of the conventional apparatus, eliminates the need for maintenance of units provided on a land and provision of a battery and chopper means for discrimination from natural light, and can surely track in a wide range even if units on a platform are located far from units on the land to thereby perform accurate measurement of positioning the platform. Disclosure of the Invention An automatic tracking type measuring apparatus according to this invention comprises a tracking measuring device having a tracking scanning body and a light wave distance measuring instrument body provided apart from each other vertically at a predetermined space, with their optical axes being parallel to each other and supported integrally rotatable horizontally and rockable vertically, and a reflector device having two corner cube prisms supported in consistency with the predetermined space vertically and with their optical axes being parallel to each other.

According to one aspect of this invention, the tracking scanning body of the tracking measuring device comprises light generating means having a semiconductor light emitting element to irradiate a modulated infrared laser beam from a semiconductor laser; polarizing means for providing circular polarization of a flux of the infrared laser beam irradiated from the light generating means; scanner means for providing plane irradiation of a circular-polarized light spot under control of a predetermined control signal; reflected light discriminating means for discriminating light reflected by the reflector device; and light receiving/sensing means for sensing and converting discriminated reflected light into horizontal and vertical control signals, whereby driving means for horizontal rotation and vertical rocking of the tracking measuring device is controlled by a signal obtained by comparing the control signal of the scanner means to the control signals from the light receiving/sensing means.

According to the tracking type light wave distance measuring apparatus with the above arrangement, for example, two reflector devices are positioned at predetermined positions at a given interval on a land along the coast, with the reflection surfaces facing setting positions on a sea, and two tracking measuring devices having a scanning body for tracking and a light wave distance measuring instrument body are arranged on a platform floating near the setting positions on the sea, at a given interval with their irradiation directions being toward the reflector devices.

When each reflector device located on the land is caught through a collimating telescope provided on the light wave distance measuring instrument body of the corresponding tracking measuring device on the platform, reflected light of light irradiated from the light wave distance measuring instrument body returns to the light wave distance measuring instrument body. After a scanner means control signal is set as a reference, automatic tracking starts.

When an infrared laser beam is emitted by the light emitting means of each tracking scanning body for automatic tracking, each laser beam is subjected to circular polarization by the polarizing means and a circular-polarized light beam is scanned in a plane-irradiation manner by the scanner means and irradiated toward the reflector device.

When each reflector device is caught by such an emitted infrared laser beam within the irradiation range, the beam is reflected in the same direction as incident light by the corner cube prism and the reflected light is discriminated by the discriminating means.

The discriminated reflected light is received and converted into horizontal and vertical control signals by the light receiving/sensing means. These control signals are compared with the reference, i.e., the scanner means control signal to detect horizontal and vertical deviations with respect to the reference bearing of the light wave distance measuring instrument body, whereby the driving means for horizontal rotation and vertical rocking of the tracking measuring device is controlled to cause the bearing of the light wave distance measuring instrument body to coincide with the bearing accurately facing the corner cube prism of the reflector device.

Such an operation is performed automatically and continuously, so that the light wave distance measuring instrument body always faces the reflector device, the distance therebetween is continuously measured, the position of the platform is determined on the basis of this distance, and the platform is moved as needed and is positioned.

Further, according to a second aspect, the tracking scanning body according to the above aspect may comprise light receiving/sensing means which senses reflected light reflected by the reflector device and focused by focusing means and converts it into horizontal and vertical control signals, whereby the driving means for horizontal rotation and vertical rocking of the tracking measuring device is controlled by a signal obtained by comparing the control signal of the scanner means with the control signals from the light receiving/sensing means.

The amount of reflected light received increases by permitting the reflected light to be focused by the focusing means then to be received by the light receiving/sensing means. The received signal is then converted into horizontal and vertical control signals by the light receiving/sensing means. These control signals are compared with the scanner means control signal to detect horizontal and vertical deviations with respect to the reference bearing of the light wave distance measuring instrument body, whereby the driving means for horizontal rotation and vertical rocking of the tracking measuring device is controlled to cause the bearing of the light wave distance measuring instrument body to coincide with the bearing accurately facing the corner cube prism of the reflector device.

Such an operation is performed automatically and continuously, so that the light wave distance measuring instrument body always faces the reflector device, the distance therebetween is continuously measured, the position of the platform is determined on the basis of this distance, and the platform is moved as needed and is positioned.

In the first and second aspects, it is premised that the reflector is included in the field of view of the automatic tracking type measuring apparatus from the beginning. The present invention may further add a search function which can search the reflector in a state where the reflector is out of the field of view, to the automatic tracking type measuring apparatus as the third aspect.

In this case, to perform the searching quickly and surely, a light beam irradiated toward the reflector device from the automatic tracking type measuring apparatus is made to be wider in the vertical direction and searching is carried out only by rotation of the apparatus in the horizontal direction in search mode.

According to this invention, at least one automatic tracking type total station having a transit device further incorporated in the automatic tracking type measuring apparatus having the above structure may be used to provide a measuring system of the position of a platform at a high accuracy as well as quickly and efficiently.

According to the first measuring system, for example, one automatic tracking type total station and a gyro-compass are provided on a platform, and one reflector is placed on a land. This automatic tracking type total station measures the distance between the platform and the reflector and provides an angle between a straight line connecting them and a reference direction set on the platform, while the gyro-compass provides bearing angle representing an angle between the platform and reference direction. Data about these distance, angle and bearing angle is entered into a computer which performs a predetermined computation to position the platform.

According to the second measuring system, two automatic tracking type measuring apparatuses are provided on a platform and two reflectors are provided at a predetermined distance therebetween on a land. One of the two automatic tracking type measuring apparatuses is an automatic tracking type total station having a transit mechanism, which can measure an angle between a line connecting two measuring apparatuses and a line connecting one reflector and one of the measuring apparatuses, for example.

According to thus constituted measuring system, the position of a platform can be measured in a short period of time by simply two automatic tracking type measuring apparatuses and two reflectors alone.

According to the third measuring system, one automatic tracking type total station and one automatic tracking type transit are arranged on a platform. In this case, the automatic tracking type total station measures a distance between it and the first reflector and an angle between a line connecting the reflector and the station and the reference direction of the platform. The automatic tracking type transit measures an angle between the other reflector and the reference direction of the platform.

BEST MODES OF CARRYING OUT THE INVENTION

Figure 1:
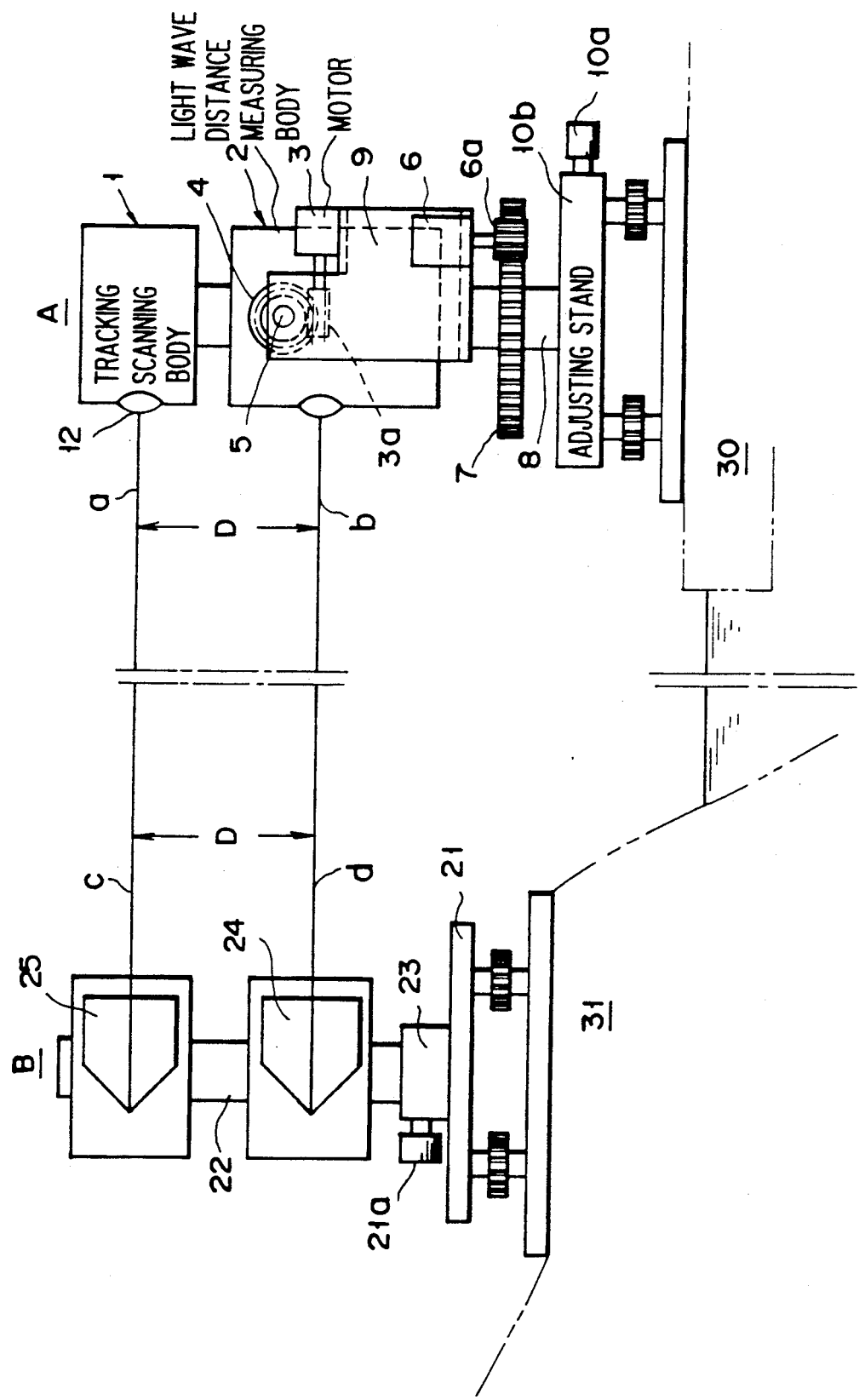
FIG. 1 is a diagram of the general structure of an automatic tracking type total station according to one embodiment of the present invention.
Figure 2:
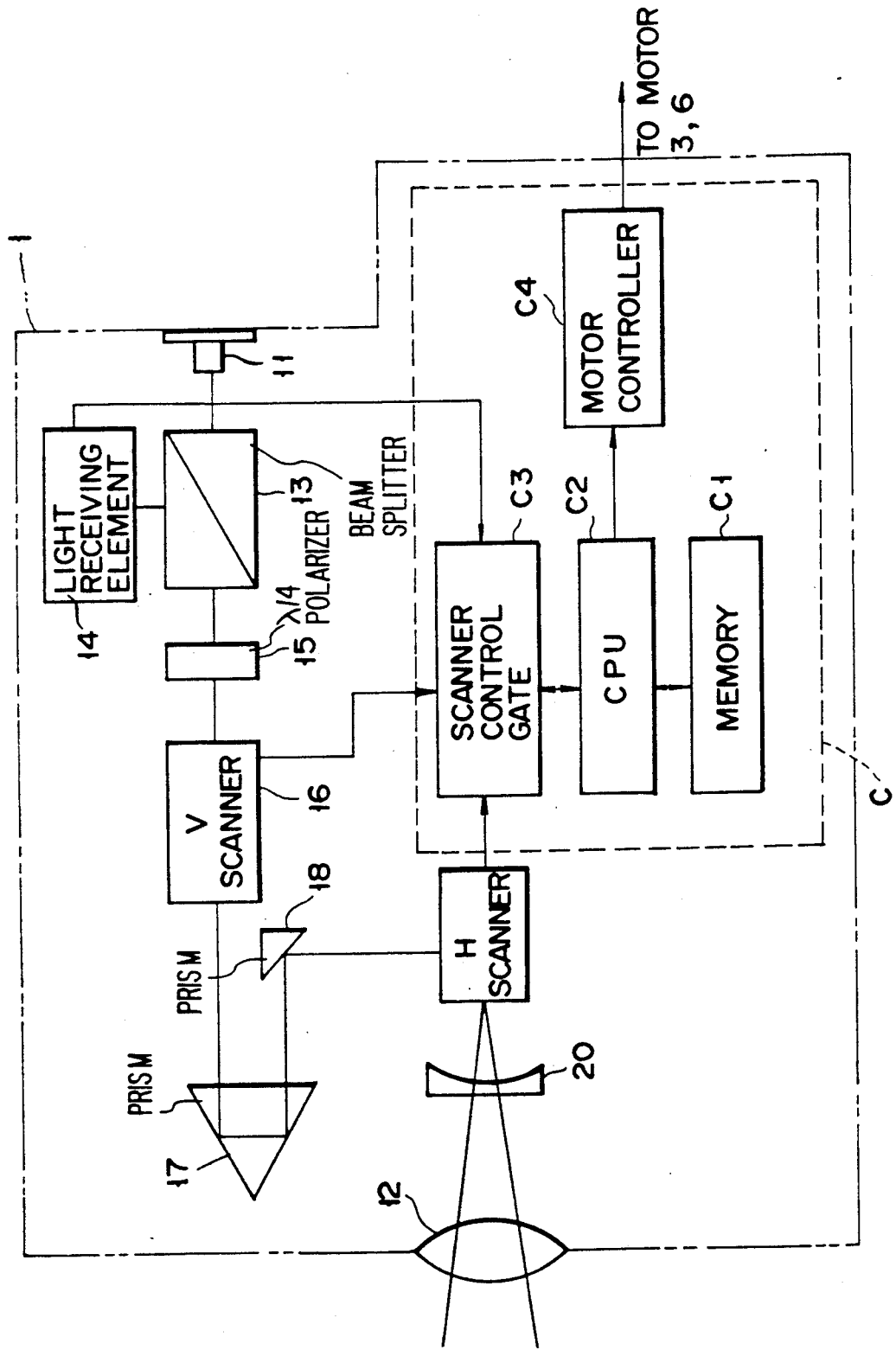
FIG. 2 is a structural diagram illustrating an optical system in FIG. 1.

FIG. 1 is a general structural diagram illustrating an automatic tracking type total station according to the present invention, and FIG. 2 is an explanatory diagram illustrating means of irradiating an infrared laser beam and reflected light receiving means provided in a tracking scanning body shown in FIG. 1.

In the diagrams, A denotes a tracking measuring device which is a total station, and B represents a reflector device.

The tracking measuring device A, which is provided on a platform 30, comprises a tracking scanning body 1, a light wave distance measuring instrument body 2 secured integral with the scanning body 1 vertically under thereof with a predetermined interval D and with their optical axes a and b being in parallel to each other, a frame 9 having the light wave distance measuring instrument body 2 supported rotatable by a horizontal shaft 5 to which a vertically rotatable gear 4 engaging a worm 3a driven by a vertical driving motor 3, and a vertical shaft 8 to which a horizontally rotatable gear 7 engaging a small gear 6a driven by a horizontal driving motor 6, and an adjusting stand 10b for movably supporting the vertical shaft 8 in such a way as to be fixed by a clamp 10a and secured on the platform in horizontally adjustable manner, whereby the vertical driving motor 3 and horizontal driving motor 6 are controlled by a tracking control signal to rotate the scanning body 1 and light wave distance measuring instrument body 2 integrally around the vertical shaft 8 and around the horizontal shaft 5.

As shown in FIG. 2, the scanning body 1 is constituted in such a way that between a light generator 11 constituted by a semiconductor light emitting element, such as an LD, for irradiating a modulated infrared laser beam from a semiconductor laser and an objective lens 12 are arranged a polarization beam splitter 13 serving as reflected light discriminating means for discriminating reflected light reflected by the reflector device B, a semiconductor light receiving element 14 serving as light receiving/sensing means for sensing and converting discriminated reflected light into horizontal and vertical control signals, a $\lambda/4$ polarizing plate 15 for providing circular polarization of a flux of an infrared laser beam irradiated from the light generator 11, a vertical scanner 16 for vertically scanning a circular-polarized light spot, a horizontal scanner 19 for horizontally scanning a circular-polarized light spot through prisms 17 and 18, and a collimator lens 20 for improving the wideness of a light source. The infrared laser beam from the light generator 11 passes the polarization beam splitter 13, and circular-polarized by the $\lambda/4$ polarizing plate 15. The circular-polarized light spot is changed to plane irradiation by the vertical and horizontal scanners 16 and 19, and is irradiated toward the reflector device B via the collimator lens 20 and objective lens 12. The reflected light reflected at the reflector device B travels in the opposite direction to that mentioned above, is discriminated by the polarization beam splitter 13 and is sensed by the semiconductor light receiving element 14.

As the light wave distance measuring instrument body 2 in use is a generally available on the market, its detailed description will be omitted.

The reflector device B is constituted in such a way that a support stand 23 designed to adjustably secure a strut 22 by means of a clamp 21a is supported on an adjusting stand 21 secured on a land 31 in a horizontally adjustable manner, and two corner cube prisms 24 and 25 are secured to the strut 22 in such a way that their optical axes c and d are in parallel to each other at the predetermined interval D.

After the corner cube prism 24 of the corresponding reflector device B placed on the land 31 is collimated from a collimating telescope (not shown) provided on the light wave distance measuring instrument body 2 of each tracking measuring device A on the platform 30 to cause the reflected light of light irradiated from the light wave distance measuring instrument body 1 return thereto, i.e., after the reflected light enters within the field of view of the light wave distance measuring instrument body 1, the tracking type measuring apparatus with the above structure automatically tracks the reflector device B and continuously measures the distance between the platform 30 and the reflector device B.

In other words, in a state where the reflected light of the light irradiated from the light wave distance measuring instrument body 1 returns to the distance measuring instrument body 1, since the infrared laser beam put to plane irradiation by the vertical and horizontal scanners 16 and 19 is at some point reflected by the corner cube prism 25, and the reflected light is sensed by the semiconductor light receiving element 14, control voltages for controlling the scanners 16 and 19 at this point of time as a horizontal reference voltage $V_{10}$ and a vertical reference voltage $V_{20}$ are set as values for a gate $C_3$ in a memory $C_1$ in a control unit C via a CPU $C_2$.

In a state where the platform floats or moves due to natural interference or the like, control voltages $V_1$ and $V_2$ of the vertical and horizontal scanners 16 and 19 at the time the semiconductor light receiving element 14 has sensed the reflected light are detected, compared with the horizontal reference voltage $V_{10}$ and vertical reference voltage $V_{20}$ read out from the memory $C_1$ in an internal computation in the CPU $C_2$, and a signal is sent to a motor controller $C_4$ to make the difference to zero to control the vertical driving motor 3 and horizontal driving motor 6, so that the scanning body 1 and light wave distance measuring instrument body 2 together are rotated around the vertical shaft 8 and around the horizontal shaft 5 to cause the distance measuring instrument body 1 to face the corner cube prism 24 of the reflector device B.

Such an operation is performed automatically and continuously, so that with the light wave distance measuring instrument body 1 always facing the reflector device, the distance therebetween is continuously measured, the position of the platform is moved on the basis of this distance, for positioning the platform.

According to the tracking type measuring apparatus as described above, the tracking measuring device located on the platform 30 comprises a tracking scanning body having light emitting means for tracking and the light wave distance measuring instrument, and the reflector device located on the land 31 has two corner cube prisms arranged and supported with the aforementioned interval vertically. It is therefore unnecessary to provide light emitting means in the reflector device on the land 31.

Further, incorporated in the tracking scanning body of the tracking measuring device mounted on the platform 30 are the light emitting means comprising a semiconductor light emitting element for irradiating a modulated infrared laser beam from a semiconductor laser, polarizing means for providing circular polarization of a flux of the infrared laser beam irradiated from this light emitting means, scanning means for providing plane irradiation of a circular-polarized light spot, and reflected light discriminating means for discriminating reflected light reflected by the reflector device. Unlike the prior art, therefore, it is unnecessary to flicker light by means of a chopper and light can be continuously scanned in a wide two-dimensional range without widening the flux of light to surely catch the reflected light and ensure automatic tracking without requiring an operator to frequently collimate.

As described above, since devices located on the land 31 need not be provided with a power source such as a battery, nor is chopper means required for discrimination from natural light, it is possible to provide a tracking type measuring apparatus, which has a simple structure, is inexpensive, can relieve a person going where the reflector device is located for maintenance of a power source such as a battery and light emitting means, can ensure tracking even if the devices on the platform 30 are located far from the devices on the land 31, and can accurately measure for positioning of the platform 30 while providing a wide moving range of a working platform in the horizontal direction.

Referring now to FIGS. 3 to 6, a description will be given of the arrangement and operation of an automatic tracking type total station according to another embodiment of this invention.

Figure 3:
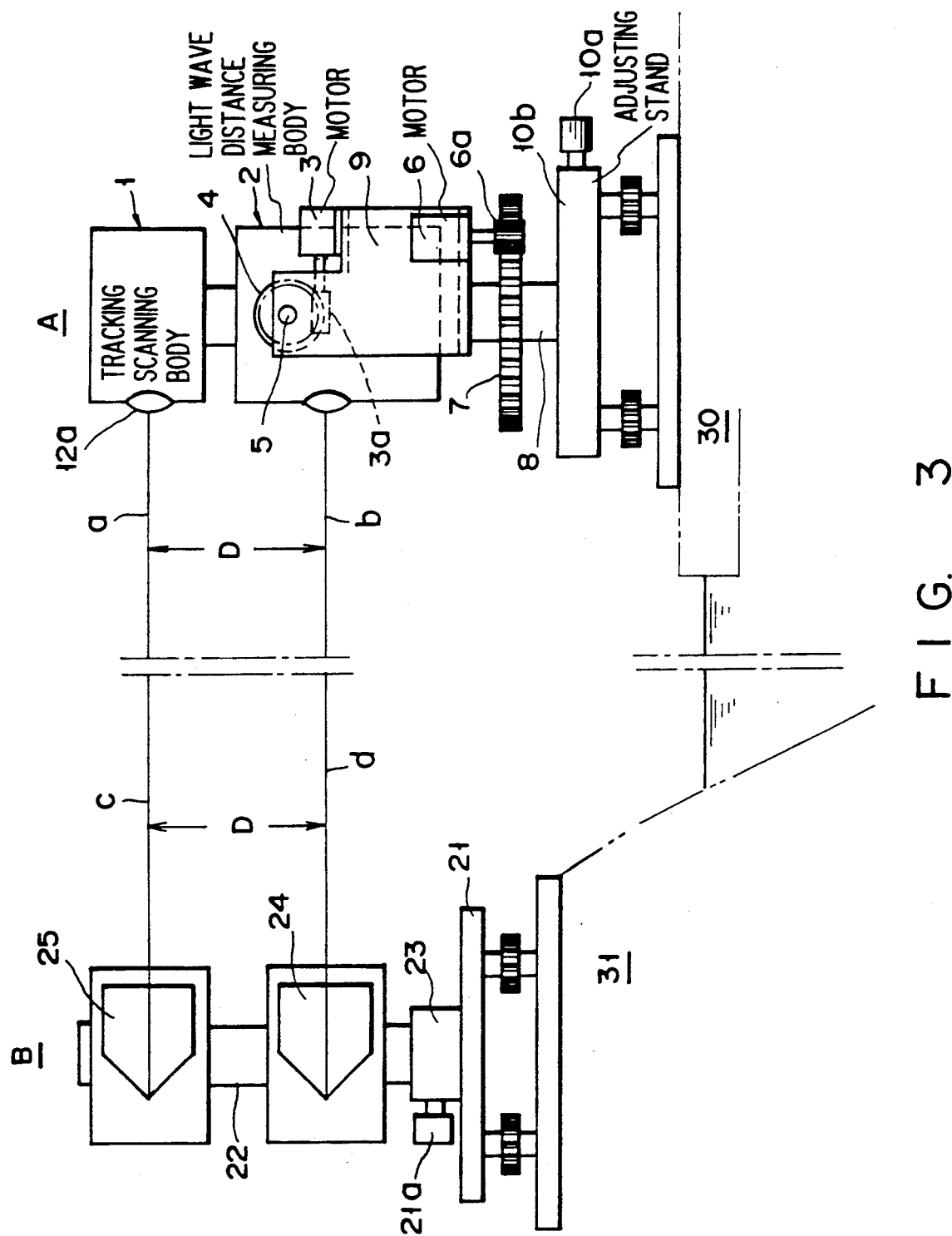
FIG. 3 is a diagram of the general structure of an automatic tracking type total station according to another embodiment of the present invention.

Referring to FIG. 3, the tracking measuring device A comprises a tracking scanning body 1, a light wave distance measuring instrument body 2 secured integral with the scanning body 1 vertically under thereof with a predetermined interval D and with their optical axes a and b being in parallel to each other, a frame 9 having the light wave distance measuring instrument body 2 supported rotatable by a horizontal shaft 5 to which a vertically rotatable gear 4 engaging a worm 3a driven by a vertical driving motor 3, and a vertical shaft 8 to which a horizontally rotatable gear 7 engaging a small gear 6a driven by a horizontal driving motor 6, and an adjusting stand 10b for movably supporting the vertical shaft 8 in such a way as to be fixed by a clamp 10a and secured on the platform in horizontally adjustable manner, whereby the vertical driving motor 3 and horizontal driving motor 6 are controlled by a tracking control signal to rotate the scanning body 1 and light wave distance measuring instrument body 2 integrally around the vertical shaft 8 and around the horizontal shaft 5.

Figure 4:
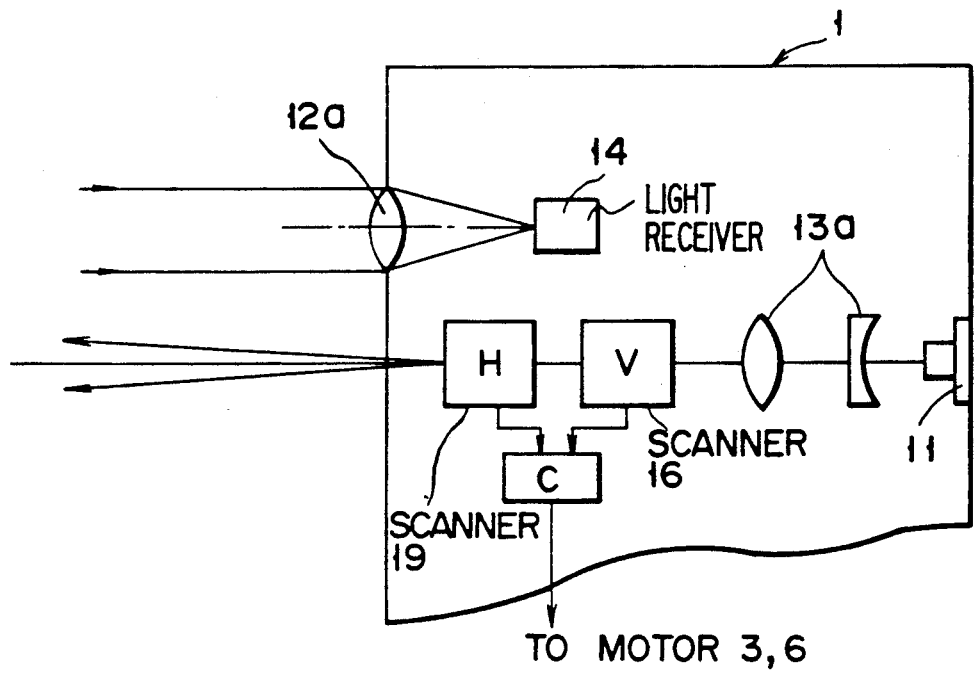
FIG. 4 is a structural diagram illustrating an optical system in FIG. 3.

As shown in FIG. 4, the scanning body 1 comprises a light generator 11 constituted by a semiconductor light emitting element, such as an LD, for irradiating a modulated infrared laser beam from a semiconductor laser, a collimator lens 13a for improving the wideness of a light source, a vertical scanner 16 for vertically scanning a light spot, a horizontal scanner 19 for horizontally scanning a light spot through prisms 17 and 18, an objective lens 12a serving as focusing means to focus reflected light reflected by the reflector device B, and a semiconductor light receiving element serving as light receiving/sensing means for sensing reflected light and converting it into horizontal and vertical control signals. The infrared laser beam from the light generator 11 passes the collimator lens 13a, is changed to plane irradiation by the vertical and horizontal scanners 16 and 19, and is irradiated toward the reflector device B. The reflected light reflected at the reflector device B causes the ob3ective lens 12a as the focusing means to focus a flux of light and causes the semiconductor light receiving element 14 to sense it.

Figure 5:
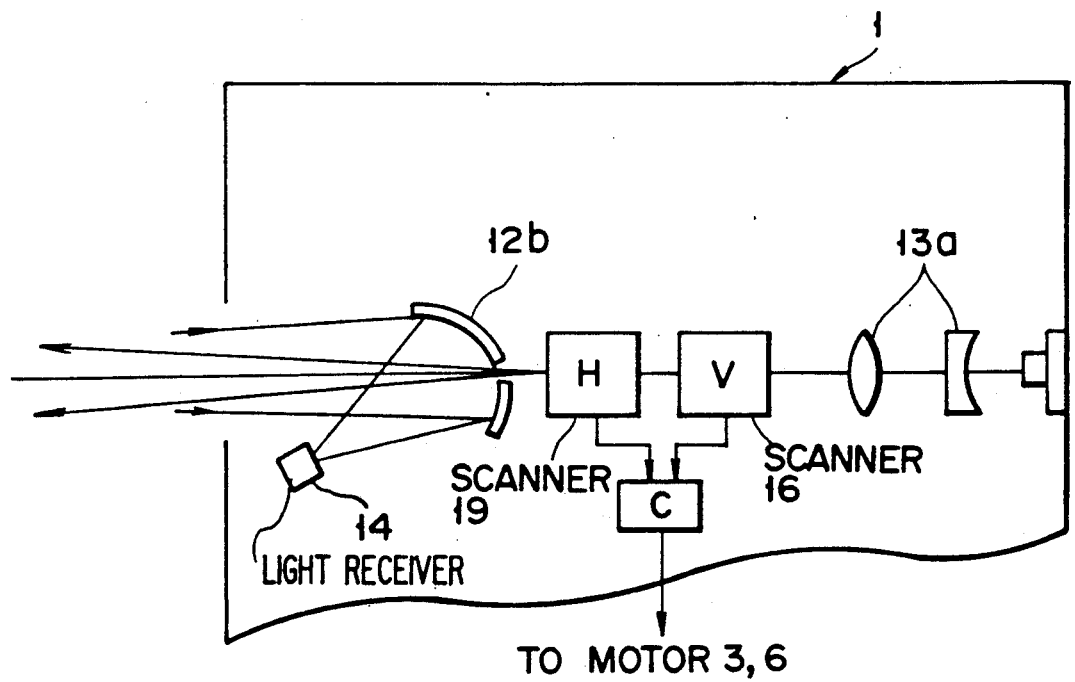
FIGS. 5 and 6 are diagrams illustrating the structures of different optical systems.
Figure 6:
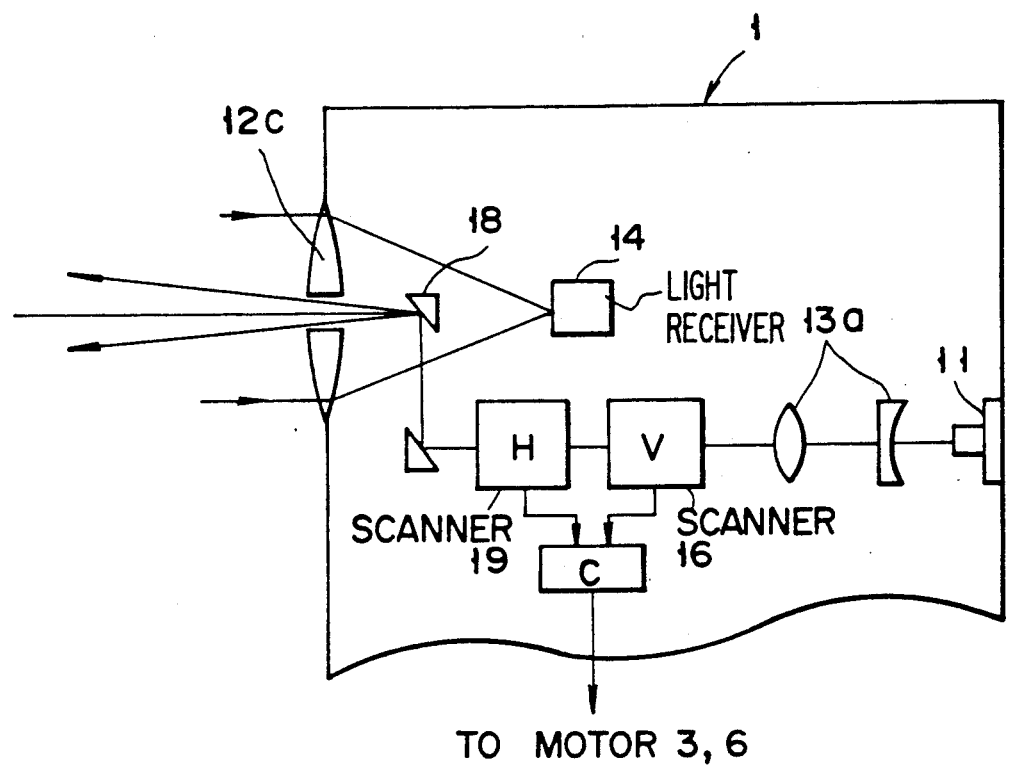

Although in the above embodiment, the position of plane irradiation of a laser beam and the focusing position of reflected light lie on different axes, the arrangements as shown in FIGS. 5 and 6 may be taken to make both positions the same.

FIG. 5 illustrates a case where a parabolic reflector 12b having an irradiation hole formed as focusing means, wherein a laser beam changed to plane irradiation by the vertical and horizontal scanners 16 and 19 is irradiated through the hole in the parabolic reflector 12b and reflected light is focused to be sensed by the semiconductor light receiving element 14.

FIG. 6 illustrates a case where an objective lens 12c has an irradiation hole formed at the center as focusing means, wherein a laser beam changed to plane irradiation by the vertical and horizontal scanners 16 and 19 is irradiated through the hole in the objective lens 12c using prisms 17 and 18 and reflected light is focused to be sensed by the semiconductor light receiving element 14.

As the light wave distance measuring instrument body 2 in use is a generally available on the market, its detailed description will be omitted.

The reflector device B is constituted in such a way that a support stand 23 designed to adjustably secure a strut 22 by means of a clamp 21a is supported on an adjusting stand 21 secured on a land in a horizontally adjustable manner, and two corner cube prisms 24 and 25 are secured to the strut 22 in such a way that their optical axes c and d are in parallel to each other at a predetermined interval D.

After the corner cube prism 24 of the corresponding reflector device B placed on the land is collimated from a collimating telescope (not shown) provided on the light wave distance measuring instrument body 2 of each tracking measuring device A on the platform to cause the reflected light of light irradiated from the light wave distance measuring instrument body 1 return thereto, the tracking type measuring apparatus with the above structure automatically tracks the reflector device B and continuously measures the distance between the platform and the reflector device B.

In other words, in a state where the reflected light of the light irradiated from the light wave distance measuring instrument body 1 returns to the distance measuring instrument body 1, since the infrared laser beam put to plane irradiation by the vertical and horizontal scanners 16 and 19 is at some point reflected by the corner cube prism 25, and the reflected light is sensed by the semiconductor light receiving element 14, control voltages that are controlling the scanners 16 and 19 at this point of time as a horizontal reference voltage $V_{10}$ and a vertical reference voltage $V_{20}$ are set as values for a gate $C_3$ in a memory $C_1$ in a control unit C via a CPU $C_2$.

In a state where the platform floats or moves due to natural interference or the like, control voltages $V_1$ and $V_2$ of the vertical and horizontal scanners 16 and 19 at the time the semiconductor light receiving element 14 has sensed the reflected light are detected by the control unit C as in FIG. 2, compared with the horizontal reference voltage $V_{10}$ and vertical reference voltage $V_{20}$, and the vertical driving motor 3 and horizontal driving motor 6 are controlled to make the difference to zero, so that the scanning body 1 and light wave distance measuring instrument body 2 together are rotated around the vertical shaft 8 and around the horizontal shaft 5 to cause the distance measuring instrument body 1 to face the corner cube prism 24 of the reflector device B.

Such an operation is performed automatically and continuously, so that with the light wave distance measuring instrument body 1 always facing the reflector device, the distance therebetween is continuously measured, the position of the platform is moved on the basis of this distance, and the platform is positioned.

According to the tracking type measuring apparatus as described above, unlike the embodiment shown in FIGS. 1 and 2, light does not reciprocate in the same optical system, thus providing less deterioration of reflected light. Further, the tracking measuring device located on the platform comprises a tracking scanning body having light emitting means for tracking and the light wave distance measuring instrument, and the reflector device located on the land has two corne cube prisms arranged and supported with the aforementioned interval vertically. It is therefore unnecessary to provide light emitting means in the reflector device on the land.

Further, incorporated in the tracking scanning body of the tracking measuring device mounted on the platform are the light emitting means comprising a semiconductor light emitting element for irradiating a modulated infrared laser beam from a semiconductor laser, and scanning means for providing plane irradiation of a light spot. Unlike the prior art, therefore, it is unnecessary to flicker light by means of a chopper and light can be continuously scanned in a wide two-dimensional range without widening the flux of light to surely catch the reflected light and ensure automatic tracking without requiring an operator to frequently collimate.

As described above, since devices located on the land need not be provided with a power source such as a battery, nor is chopper means required for discrimination from natural light, it is possible to provide a tracking type measuring apparatus, which has a simple structure, is inexpensive, can relieve a person going where the reflector device is located for maintenance of a power source such as a battery and light emitting means, can ensure tracking even if the devices on the platform are located far from the devices on the land, and can accurately measure for positioning of the platform while providing a wide moving range of a working platform in the horizontal direction.

Instead of executing automatic tracking in a state where the reflector is within the field of view of the automatic tracking type total station, the operation may start from a state where it is not in the field of view and automatic tracking should be executed after the reflector is put in the field of view.

Figure 7:
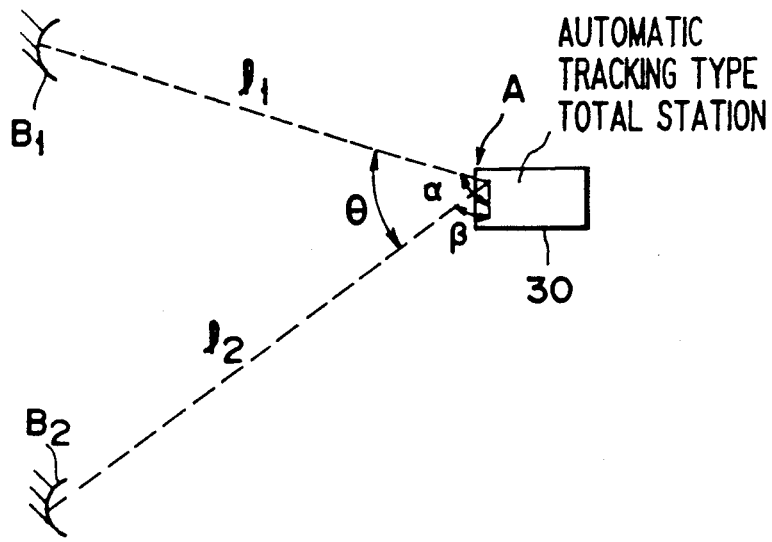
FIG. 7 is a principle diagram of the structure of a further embodiment of this invention.
Figure 8:
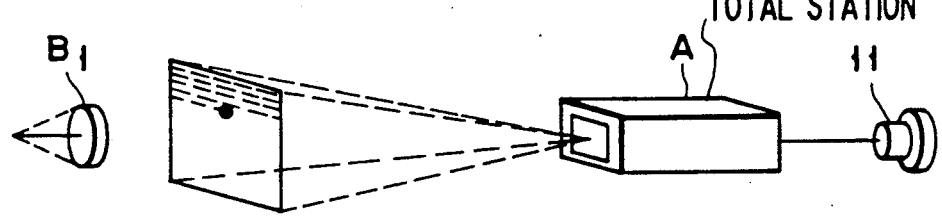
FIGS. 8 and 9 are diagrams illustrating scanning methods in the embodiment shown in FIG. 7.

As shown in FIG. 7, reflectors $B_1$ and $B_2$ are placed at fixed reference points measuring stand on a land or a sea, one automatic tracking light wave distance measuring instrument/transit or one automatic tracking type total station A is mounted on the platform 30, and light from the laser 11 is scanned horizontally and vertically and is projected toward the reflector B1. (Refer to FIG. 8.)

At this time, the reflected laser is received and the horizontal and vertical motors are driven in that direction to ensure automatic tracking. When a distance $l_1$ and an angle $\alpha$ are attained by the automatic tracking type total station A, the mode is changed to a search mode to permit the laser beam to be scanned only in the vertical direction (see FIG. 9) and to rotate the total station A counterclockwise to receive the laser from the reflector B2 before stopping it. The mode is again changed to the automatic tracking mode in which horizontal scanning is added to execute automatic tracking to measure a distance $l_2$ and an angle $\beta$.

The above operation is repeated, so that the distances $l_1$ and $l_2$ as well as the angles $\alpha$ and $\beta$ are continuously measured, the individual data is automatically entered in a microcomputer (to be described later) in which predetermined computation equations are stored, for computation to measure the present position of the platform that varies from time to time, and the position is displayed on a display section (to be described later).

This method is characterized in switching between laser scanning in automatic tracking mode and rotating laser scanning in search mode. In automatic tracking mode where the laser is scanned vertically and horizontally, the light projecting time per unit area is short. If the automatic tracking type total station A is rotated in that state, the light projecting time per unit area is further shortened due to the relation with the rotational velocity, so that the reflected light from the reflector cannot be caught by the light receiving element.

Figure 9:
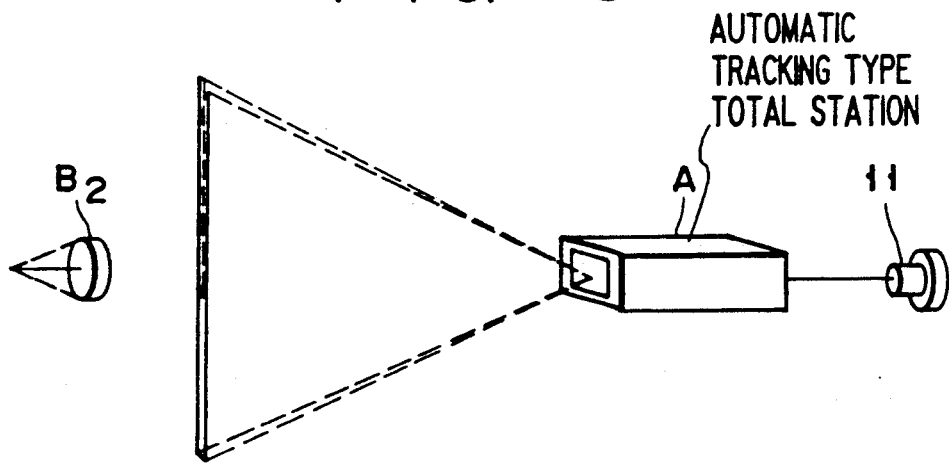

To overcome this problem, if only vertical scanning is permitted as shown in FIG. 9 during rotation as in this method, the light projecting time per unit area gets longer, so that every increasing the rotational velocity of the total station A can permit the laser beam from the reflector to be caught by the light receiving element.

The present method, realized as described above, has various advantages such as capable of accurately automatically measuring the present position of a platform in a short period of time by a single measuring device and significantly reducing the cost due to only one measuring device being used, as compared with the conventional measuring method which uses three or more very expensive measuring devices.

A description will now be given of a method of positioning a platform by using an automatic tracking type total station according to this invention. In the apparatus shown in FIG. 10, the gyro-compass serves to measure an angle difference with respect to a predetermined bearing and convert it into an electrical signal to ensure a numeral display thereof.

Figure 10:
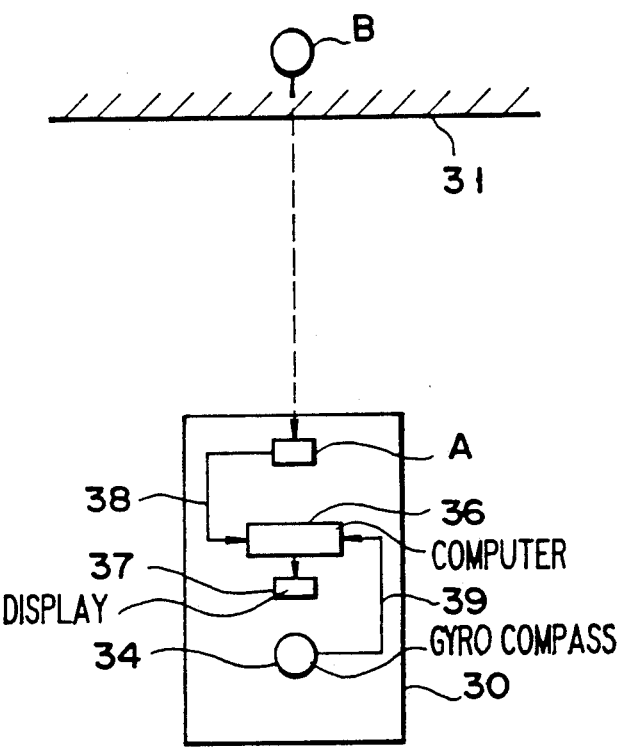
FIG. 10 is a structural diagram of a measuring system according to this invention.

FIG. 10 illustrates the arrangement of the automatic tracking light wave distance measuring instrument/transit, i.e., the automatic tracking type total station A, and the gyro-compass 34, which are used in realizing the present method. Reference numeral 30 denotes a platform floating on a sea, and 31 denotes a fixed reference base set on a measuring stand on the sea or on a land.

One automatic tracking light wave distance measuring instrument/transit A is provided at an edge portion of the platform 30, and one gyro-compass 34 on the platform 30. The reflector B is placed on the fixed reference base 31 as a collimating point of the light wave distance measuring instrument/transit A.

The above two measuring devices A and 34 are coupled to a computer or a microcomputer 36 on the platform 30 respectively by cables 38 and 39, and the computer 36 is further coupled to a display section 37.

Figure 11:
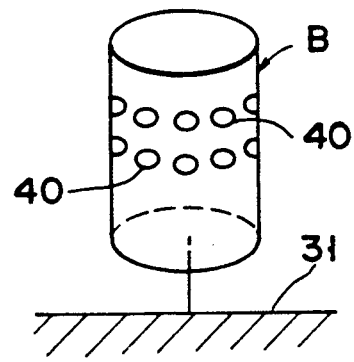
FIG. 11 is a structural diagram of a reflector shown in FIG. 10.

The reflector B is designed to have a plurality of prisms 40 on the surface of a cylindrical board, which reflect light in the same direction as it has come and receive and reflect light from a wide range, as shown in FIG. 11.

The computer 36 has computational equations (to be described later) stored therein and receives data from both measuring units A and 34 to perform predetermined computations. Based on the computed values from the computer 36, the display section 37 displays the present position of the platform 30 in graphical display from time to time.

Figure 12:
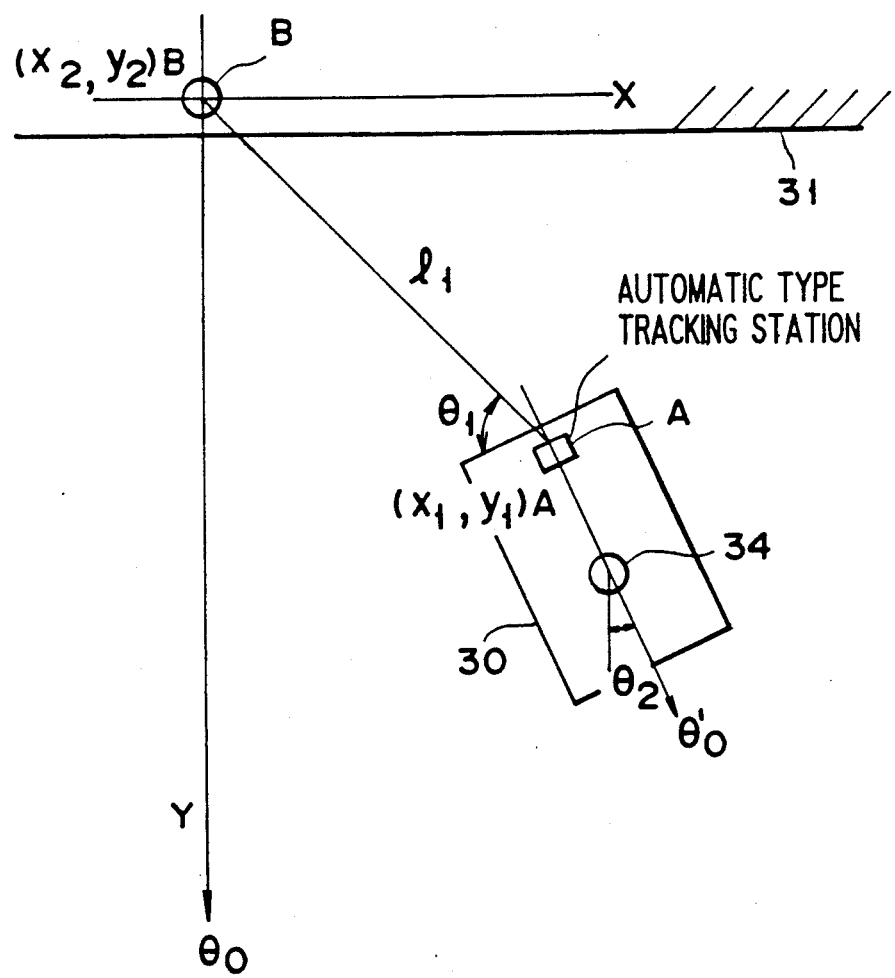
FIG. 12 is a principle diagram of measurement by the structure shown in FIG. 10.

Referring now to FIG. 12, an example of computation by the present measuring method will be described.

A distance $l_1$ to the reflector B and an angle $\theta_1$ between the reflector B and the reference direction of the platform 30 are measured by the automatic tracking light wave distance measuring instrument/transit A.

An angle difference $\theta_2$ with respect to a predetermined bearing y is measured by the gyro-compass 34. These items of data are input to the computer 36 having predetermined equations stored in advance therein, to compute the position of point A (i.e., a specific working position on the platform 30).

In the diagram, point B ($x_2$, $y_2$) and an azimuth or a bearing angle $\theta_0$ are values acquired by conducting measuring in advance.

In FIG. 12,

A ($x_1$, $y_1$) = position coordinates of the working point of the automatic tracking light wave distance measuring instrument/transit, B ($x_2$, $y_2$) = coordinates of the position of the reflector B, $l_1$ = measuring distance, $\theta_0$, $\theta_0'$ = bearing angle, and $\theta_1$, $\theta_2$ = measuring angle.

Thus, $\theta_2 = \theta_0 - \theta_0'$ $x_1 = x_2 + l_1 \cos(\theta_1 - \theta_2)$ $y_1 = y_2 + l_1 \sin(\theta_1 - \theta_2)$ The position (A) of the platform 30 is acquired in this manner, and based on which, the coordinates of A, i.e., the present position of the platform 30 is displayed on the display section 37.

According to this method, one operator can quickly know the present position of the platform 30 while viewing the coordinates shown on the display section 37.

Further, the present method conducts the positional measurements with only two measuring devices, the aforementioned automatic tracking light wave distance measuring instrument/transit A and a relatively low-cost gyro-compass, thus significantly reducing the cost of the devices in use as compared with the prior art method which requires three or more expensive automatic tracking type light wave distance measuring instruments.

According to this method, light is simply projected toward the reflector B from the automatic tracking type total station A and does not, unlike the prior art method, require a light source-incorporated telescope provided at the reflector, thus eliminating the need for a power source on the reflector side. This makes the present method very economical as well as provides easier maintenance.

Further, since only one automatic tracking type light wave distance measuring instrument/transit A is used in the present method, there are advantages such that only one reflector B to be mounted on the reference base is needed and there is only one place to measure the coordinates of point B on the reference base 31, thus significantly simplifying the measurement.

Figure 13:
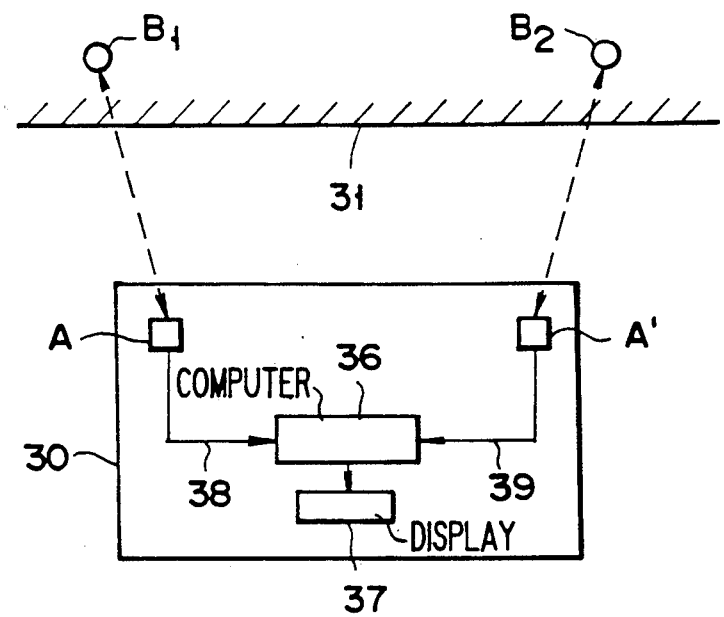
FIG. 13 is a diagram illustrating the arrangement of devices of another measuring system.
Figure 14:
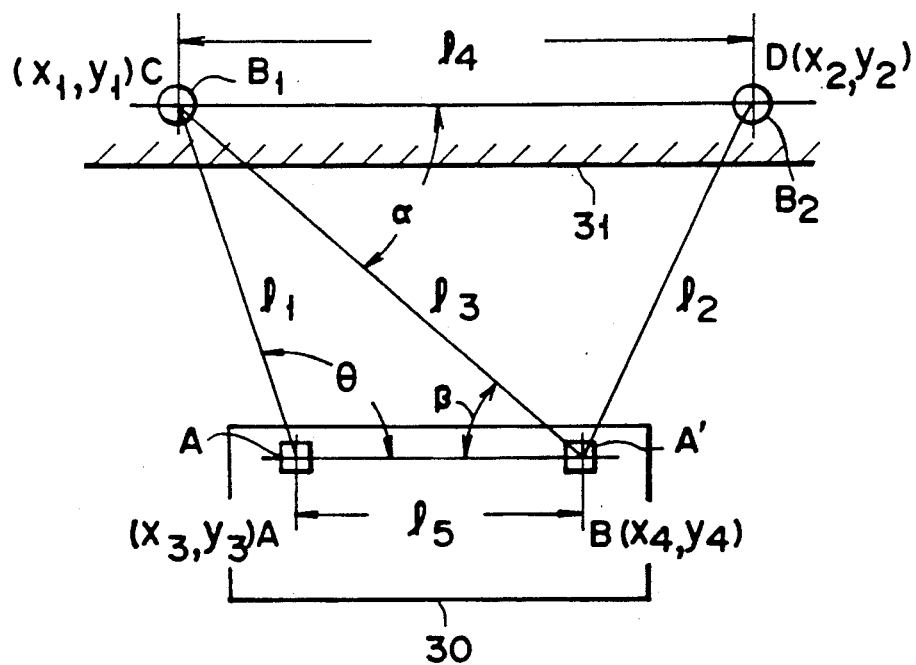
FIG. 14 is a principle diagram of measurement by the structure shown in FIG. 13.

FIGS. 13 and 14 illustrate still another measuring method.

FIG. 13 illustrates the arrangement of the automatic tracking light wave distance measuring instrument/transit A and the automatic tracking light wave distance measuring instrument, which are used in realizing the present method. Reference numeral 30 denotes a platform floating on a sea, and 31 denotes a fixed reference base set on a fixed measuring stand on the sea or on a land.

One automatic tracking light wave distance measuring instrument/transit A is provided at one (on the left side in the diagram) of right and left edge portions of the platform 30, and one automatic tracking light wave distance measuring instrument A' on the other (on the right side in the diagram). The reflectors B1 and B2 are placed on the fixed reference base 31 as its collimating point.

The left automatic tracking light wave distance measuring instrument/transit A is collimating the left reflector B1, and the right automatic tracking light wave distance measuring instrument A' is collimating the right reflector B2.

The above two measuring devices A and A' are coupled to a computer 36 on the platform 30 respectively by cables 38 and 39, and the computer 36 is further coupled to a display section 37.

The reflectors B1 and B2, like the one shown in FIG. 11, are designed to have a plurality of prisms 40 on the surface of a cylindrical board, which reflect light in the same direction as it has come and receive and reflect light from a wide range, as shown in FIG. 11.

The computer 36 has computational equations (to be described later) stored therein and receives data from both distance measuring instruments A and A' to perform predetermined computations. Based on the computed values from the computer 36, the display section 37 displays the present position of the platform 30 in graphical display from time to time.

Needless to say, the positions of the light wave distance measuring instrument/transit A and light wave distance measuring instrument A' may be reversed.

Referring now to FIG. 14, an example of computation by the present method will be described.

A distance $l_1$ to the reflector B1 and an angle $\theta$ between the reflector B1 and the reference direction of the platform 30 are measured by the automatic tracking light wave distance measuring instrument/transit A. A distance $l_2$ between the instrument A' and the reflector B2 is measured by the other light wave distance measuring instrument A'. These items of data are input to the computer 36 having predetermined equations stored in advance therein, to compute the positions of A and B (thus, reference position of the platform 30).

In the diagram, $l_4$, $l_5$, point C ($x_1$, $y_1$) and point D ($x_2$, $y_2$) are values acquired by conducting measuring in advance. In FIG. 14, C ($x_1$, $y_1$) = coordinates of the position of the reflector B1

D ($x_2$, $y_2$) = coordinates of the position of the reflector B2

A ($x_3$, $y_3$) = positional coordinates of the automatic tracking light wave distance measuring instrument A B ($x_4$, $y_4$) = coordinates of the position of the automatic tracking light wave distance measuring instrument A'

$l_1$, $l_2$ = measuring distance, $\theta$ = bearing angle, $l_4$ = distance between the reflectors B1 and B2, and $l_5$ = distance between the automatic tracking light wave distance measuring instrument/transit A and automatic tracking light wave distance measuring instrument A'.

$l_3$ and the angle $\alpha$ can be computed by the following equations (1) and (2).

$$l_3 = \sqrt{l_1^2 + l_5^2 - 2 \times l_1 \times l_5 \times \cos\theta} \tag{1}$$

$$\begin{cases} \cos\alpha = \dfrac{l_3^2 + l_4^2 - l_2^2}{2 \times l_3 \times l_4} \\ \alpha = \cos^{-1}\left(\dfrac{l_3^2 + l_4^2 - l_2^2}{2 \times l_3 \times l_4}\right) \end{cases} \tag{2}$$

$$\begin{cases} \cos\beta = \dfrac{l_1^2 + l_3^2 - l_5^2}{2 \times l_1 \times l_3} \\ \beta = \cos^{-1}\left(\dfrac{l_1^2 + l_3^2 - l_5^2}{2 \times l_1 \times l_3}\right) \end{cases}$$

From the above values, point A ($x_3$, $y_3$) and point B ($x_4$, $y_4$) can be obtained by the following equations.

$$x_3 = x_1 + l_3 \times \cos\alpha - l_5 \times \cos(\alpha + \beta - 180°) \tag{3}$$

$$y_3 = y_1 + l_3 \times \sin\alpha - l_5 \times \sin(\alpha + \beta - 180°) \tag{4}$$

$$x_4 = x_1 + l_3 \cos\alpha \tag{5}$$

$$y_4 = x_1 + l_3 \sin\alpha \tag{6}$$

The reference positions (A, B) of the platform 30 are acquired in this manner, and based on which, the coordinates of A and B, i.e., the present position of the platform 30 is displayed on the display section 37.

According to this method, one operator can quickly know the present position of the platform 30 while viewing the coordinates shown on the display section 37.

Further, the present method conducts the positional measurements with only two automatic tracking type light wave distance measuring instruments, thus significantly reducing the cost of the devices in use as compared with the prior art method which requires three or more automatic tracking type light wave distance measuring instruments.

According to this method, light is simply projected toward the reflector on the land 31 from the light wave distance measuring instrument on the platform 30 and does not, unlike the prior art method, require a light source-incorporated telescope provided at the reflector, thus eliminating the need for a power source on the reflector side. This provides various advantages such that the present method is very economical as well as ensures easier maintenance.

Figure 15:
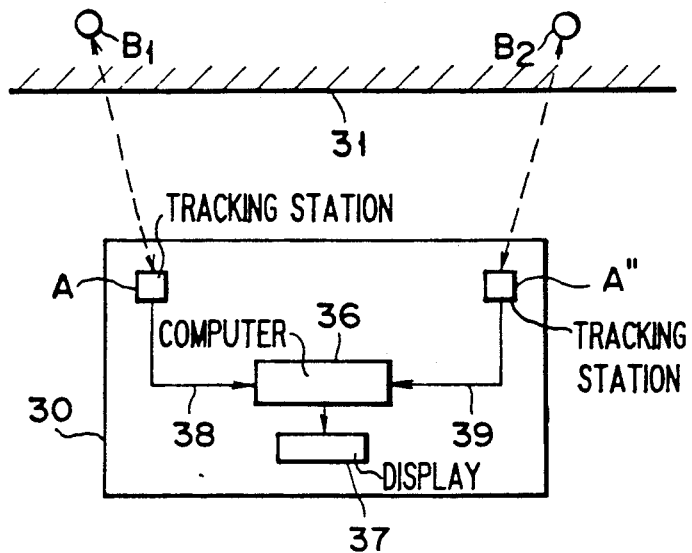
FIG. 15 is a diagram illustrating the arrangement of devices of still another measuring system.
Figure 16:
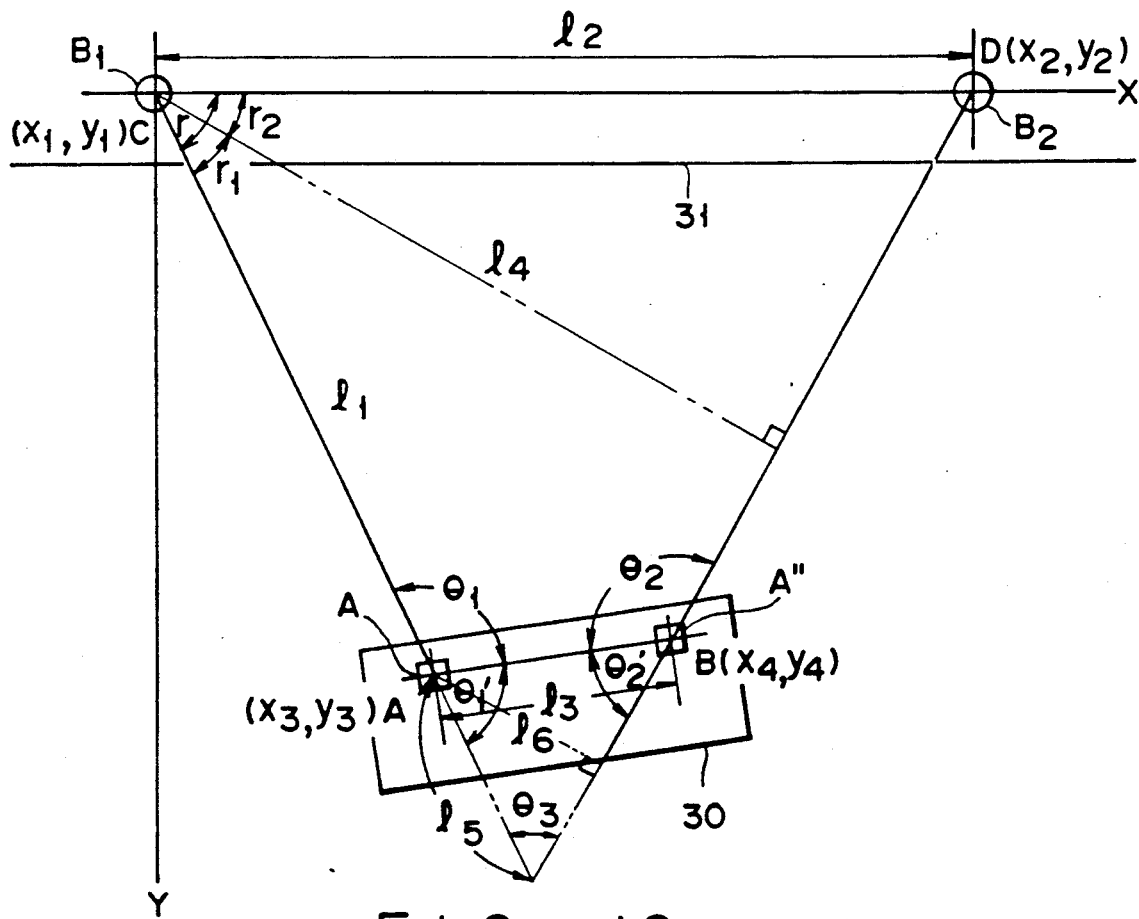
FIG. 16 is a principle diagram of measurement by the structure shown in FIG. 15.

FIGS. 15 and 16 illustrate still another measuring method.

FIG. 15 illustrates the arrangement of the automatic tracking light wave distance measuring instrument/transit and the automatic tracking light wave distance measuring instrument, which are used in realizing the present method. Reference numeral 30 denotes a platform floating on a sea, and 31 denotes fixed reference base set on a measuring stand on the sea or on a land.

One automatic tracking light wave distance measuring instrument/transit A is provided at one (on the left side in the diagram) of right and left edge portions of the platform 30, and one automatic tracking light wave distance measuring instrument A'' on the other (on the right side in the diagram). The reflectors B1 and B2 are placed on the fixed reference base 31 as its collimating point.

The left automatic tracking light wave distance measuring instrument/transit A is collimating the left reflector B1, and the right automatic tracking light wave distance measuring instrument A'' is collimating the right reflector B2.

The above two measuring devices A and A' are coupled to a computer 36 on the platform 30 respectively by cables 38 and 39, and the computer 36 is further coupled to a display section 37.

The reflectors B1 and B2, like the one shown in FIG. 11, are designed to have a plurality of prisms 40 on the surface of a cylindrical board, which reflect light in the same direction as it has come and receive and reflect light from a wide range, as shown in FIG. 11.

The computer 36 has computational equations (to be described later) stored therein and receives data from both measuring units A and A" to perform predetermined computations. Based on the computed values from the computer 36, the display section 37 displays the present position of the platform 30 in graphical display from time to time.

Needless to say, the positions of the light wave distance measuring instrument/transit A and transit A" may be reversed.

Referring now to FIG. 16, an example of computation by the present method will be described.

A distance $l_1$ to the reflector B1 and an angle $l_1$ between the reflector B1 and the reference direction A—A" of the platform 30 are measured by the automatic tracking light wave distance measuring instrument/transit A. An angle $\theta_2$ with respect to the reference direction A—A" of the platform 30 is measured at the same time by the other transit A". These items of data are input to the computer 36 having predetermined equations stored in advance therein, to compute the positions of A and B (thus, the position of the platform In the diagram, $l_2$, $l_3$, point C ($x_1$, $y_1$) and point D ($x_2$, $y_2$) are values acquired by conducting measuring in advance.

In FIG. 16,

C ($x_1$, $y_1$) = coordinates of the position of the reflector B1

D ($x_2$, $y_2$) = coordinates of the position of the reflector B2

A ($x_3$, $y_3$) = positional coordinates of the automatic tracking light wave distance measuring instrument A B ($x_4$, $y_4$) = coordinates of the position of the automatic tracking transit A $l_1$ = measuring distance, $\theta_1$, $\theta_2$ = bearing angle, $l_2$ = distance between the reflectors B1 and B2, and $l_3$ = distance between the automatic tracking light wave distance measuring instrument/transit A and automatic tracking transit A"

With the position of the platform 30 restricted to $x_1 \leq x_3 \leq x_2$, $x_1 \leq x_4 \leq x_2$, $\theta_3$ can be attained as follows:

$$\theta_{1'} = \pi - \theta_1$$

$$\theta_{2'} = \pi - \theta_2$$

$$\theta_3 = \pi - (2\pi - \theta_1 - \theta_2)$$

$l_5$ can be attained as follows:

$$l_6 = l_3 \sin \theta_{2'}$$

$$l_5 = l_6/\sin \theta_3$$

$l_4$ can be attained as follows:

$$l_4 = (l_1 + l_5) \sin \theta_3$$

$\gamma$ can be attained as follows:

$$\gamma_1 = (\pi/2) = \theta_3$$

$$\gamma_2 = \cos^{-1}(l_4/l_2)$$

$$\gamma = \gamma_1 + \gamma_2$$

the coordinates ($x_3$, $y_3$) of point A can be attained as follows:

$$x_3 = x_1 + l_1 \cos \gamma$$

$$y_3 = y_1 + l_1 \sin \gamma$$

the coordinates ($x_4$, $y_4$) of point B can be attained as follows:

$$\epsilon = \pi - (\theta_1 + \gamma)$$

$$x_4 = x_3 + l_3 \cos \epsilon$$

$$y_4 = y_3 - l_3 \sin \epsilon$$

The positions (A, B) of the platform 30 are acquired in this manner, and based on which, the coordinates of A and B, i.e., the present position of the platform 30 is displayed on the display section 37.

According to this method, one operator can quickly know the present position of the platform 30 while the coordinates shown on the display section 37.

Further, the present method conducts the positional measurements with only two automatic tracking type light wave distance measuring instruments A and A", thus significantly reducing the cost of the devices in use as compared with the prior art method which requires three or more automatic tracking type light wave distance measuring instruments.

According to this method, a laser beam is simply projected toward the reflectors B1 and B2 and does not, unlike the prior art method, require a light source-incorporated telescope provided at the reflector, thus eliminating the need for a power source on the reflector side. This provides various advantages such that the present method is very economical as well as ensures easier maintenance.

We claim:

1. An automatic tracking type measuring apparatus, comprising:

reflector means for reflecting an incident light; and tracking measuring means having a tracking scanning body and a light wave distance measuring instrument body provided apart from each other vertically at a separation distance, and integrally supported for horizontal rotation;

wherein said tracking scanning body of said tracking measuring means comprises:

scanning means for scanning the laser beam only in the vertical direction in a field of view of the tracking measuring device when said tracking measuring device is set in a search mode for searching for said reflector means positioned apart from said tracking measuring device and for scanning the laser beam both in the horizontal and vertical directions in the field of view of the tracking measuring means when said reflector means is in the field of view of said tracking measuring means and when said tracking measuring means is set in an automatic tracking mode;

rotating means for rotating said tracking measuring means only in the horizontal direction when said tracking measuring means is set in the search mode;

means for detecting the reflector means in the field of view of the tracking measuring means from a reflected laser beam reflected from said reflector means; and means for stopping rotation of said tracking measuring means when the reflector means is detected in the field of view of the tracking measuring means.

2. An apparatus according to claim 1, wherein said reflector means includes two corner cube prisms supported in conformity with said separation distance vertically and with their optical axes being parallel to each other.

3. An apparatus according to claim 2, wherein said laser beam emitting means includes a semiconductor laser to emit a modulated infrared laser beam.

4. An apparatus according to claim 3, wherein said tracking measuring means further includes polarizing means for providing circular polarization of said infrared laser beam generated from said semiconductor.

5. An apparatus according to claim 1, wherein said light emitting means has a light axis different from a light axis of said detecting means in said tracking scanning body.

6. An apparatus according to claim 1, wherein said light emitting means has a light axis coincidence with a light axis of said detecting means in said tracking scanning body.

7. An apparatus according to claim 6, wherein said tracking scanning body includes a parabolic reflector having an irradiation hole for emitting said laser beam to said reflector means through said irradiation hole and the reflected laser beam is reflected by the parabolic reflector and focused on said detecting means.

8. An apparatus according to claim 6, wherein said tracking scanning body includes an objective lens having an irradiation hole formed at a center of the objective lens for emitting said laser beam to said reflector means through the irradiation hole and the reflected laser beam is focused on said detecting means by the objective lens.

9. An automatic tracking method, comprising the steps of:
irradiating to a reflector means a tracking laser beam and a distance measuring laser beam which are apart from each other vertically at a separation distance;
scanning the tracking laser beam only in the vertical direction in a field of view of a tracking measuring means when said tracking measuring means is set in a search mode for searching for said reflector means positioned apart from said tracking measuring means;
scanning the tracking laser beam both in the horizontal and vertical directions in the field of view of the tracking measuring means when said reflector means is in the field of view of said tracking measuring means and when said tracking measuring means is set in an automatic tracking mode;
rotating said tracking measuring means only in the horizontal direction when said tracking measuring means is set in the search mode;
detecting the reflector means in the field of view of the tracking measuring means from a reflected tracking laser beam reflected from said reflector means; and
stopping rotation of said tracking measuring means when the reflector means is detected in the field of view of the tracking measuring means.

* * * * *